(12) United States Patent
Kamiyama et al.

(10) Patent No.: US 7,503,349 B2
(45) Date of Patent: Mar. 17, 2009

(54) LATERAL PIPE LINING MATERIAL AND LATERAL PIPE LINING METHOD USING SAME

(75) Inventors: Takao Kamiyama, Hiratsuka (JP); Koji Kaneta, Hiratsuka (JP); Kenji Fujii, Hiratsuka (JP)

(73) Assignee: Shonan Gosei-Jushi Seisakusho K.K. (JP)

( * ) Notice: Subject to any disclaimer, the term of this patent is extended or adjusted under 35 U.S.C. 154(b) by 0 days.

(21) Appl. No.: 11/653,018

(22) Filed: Jan. 12, 2007

(65) Prior Publication Data
US 2008/0169036 A1  Jul. 17, 2008

(51) Int. Cl.
*F16L 55/16* (2006.01)

(52) U.S. Cl. .................. 138/98; 138/97; 405/150.1; 405/184.2; 156/287; 156/294; 264/269

(58) Field of Classification Search .............. 138/98, 138/97; 405/184, 157, 150.1, 154, 156, 184.2; 156/287, 294, 94, 574; 264/269, 267, 516
See application file for complete search history.

(56) References Cited

U.S. PATENT DOCUMENTS

| | | | | |
|---|---|---|---|---|
| 5,439,033 A | * | 8/1995 | Kamiyama et al. | 138/98 |
| 5,451,284 A | * | 9/1995 | Ikeda et al. | 156/247 |
| 5,454,401 A | * | 10/1995 | Kamiyama et al. | 138/98 |
| 5,566,719 A | * | 10/1996 | Kamiyama et al. | 138/98 |
| 5,598,873 A | * | 2/1997 | Kamiyama et al. | 138/98 |
| 5,700,110 A | * | 12/1997 | Kamiyama et al. | 405/184.2 |
| 5,950,682 A | * | 9/1999 | Kiest, Jr. | 138/98 |
| 5,971,031 A | * | 10/1999 | Kamiyama et al. | 138/98 |
| 6,006,787 A | * | 12/1999 | Kamiyama et al. | 138/98 |
| 6,039,079 A | * | 3/2000 | Kiest, Jr. | 138/98 |
| 6,152,184 A | * | 11/2000 | Kamiyama et al. | 138/98 |
| 6,227,764 B1 | * | 5/2001 | Einhaus et al. | 405/157 |
| 6,994,118 B2 | * | 2/2006 | Kiest et al. | 138/98 |
| 2006/0130922 A1 | * | 6/2006 | Kamiyama et al. | 138/98 |

* cited by examiner

*Primary Examiner*—Patrick F Brinson
(74) *Attorney, Agent, or Firm*—Adams & Wilks

(57) ABSTRACT

A lateral pipe lining material is comprised of a tubular resin absorbing material impregnated with a setting resin and has a flange formed on one end thereof. A peeling tube is mounted to an outer periphery of an area around the flange. A tubular peeling end, one end of which closed off, is mounted to an outer peripheral part of the other end of the tubular resin absorbing material. The other end of the peeling tube is mounted to a pressure bag, compressed air is fed into the pressure bag in a state in which the flange of the lateral pipe lining material is attached to a peripheral edge of an opening of a lateral pipe of a main pipe, and the lateral pipe lining material is everted and inserted into the lateral pipe from the main pipe side toward ground level via air pressure. The lateral pipe lining material is then heated while being pressed against an inner peripheral surface of the lateral pipe. After the setting resin impregnated in the lateral pipe lining material has been cured, the peeling end is peeled away and removed from the main pipe-side.

18 Claims, 6 Drawing Sheets

LATERAL PIPE LINING MATERIAL AND LATERAL PIPE LINING METHOD USING SAME

BACKGROUND OF THE INVENTION

1. Field of the Invention

The present invention relates to a lateral pipe lining material for lining a lateral pipe that branches off from a main pipe, and a lateral pipe lining method using the lateral pipe lining material.

2. Description of the Prior Art

A pipe lining method is known wherein an inner peripheral surface of an aged sewer pipes or other underground pipe is lined and repaired without the pipe being removed from the ground (for example, see U.S. Pat. No. 5,225,121).

In the pipe lining method, a pipe lining material is used which is comprised of a flexible tubular resin absorbing material impregnated with a setting resin with its outer peripheral surface being covered with a highly airtight film. The pipe lining material is everted and inserted into the pipeline under fluid pressure, and pressed against an inner peripheral surface of the pipeline. Heat is then applied to the pipe lining material to cure the setting resin contained therein, thereby lining the inner peripheral surface of the pipeline.

A method that can be applied to a lateral pipe branching out from a main pipe is disclosed in, e.g., U.S. Pat. No. 5,329,063. In this method, a flange formed on one end of a lateral pipe lining material is disposed inside a pressure bag and placed on a setting nozzle of a work robot guided into the main pipe, and the work robot is driven so that the flange will be attached tightly to a peripheral edge of an opening of a lateral pipe of the main pipe. Feeding compressed air into the pressure bag will cause the lateral pipe lining material to be subjected to the pressure of the compressed air and to be everted and inserted from the main pipe into the lateral pipe toward the ground level side. When the lining material has been everted and inserted over the entire length of the lateral pipe, the lateral pipe lining material is heated while being pressed against the inner peripheral surface of the lateral pipe and the thermosetting resin contained therein is cured. This causes the inner peripheral surface of the lateral pipe to be lined and repaired. Once the curing of the lateral pipe lining material is complete, the everted end portion of the lateral pipe lining material that protrudes toward a collector that opens to the ground level is cut off, and the work robot is removed from the pressure bag and main pipe to complete the lateral pipe lining process sequence.

However, the operation for removing the everted end portion of the lateral pipe lining material that protrudes toward the collector may not necessarily be possible due to local conditions at the ground level. In addition, a problem may arise in that the operation for removing the ground level-side terminal part of the lateral pipe lining material will be difficult when the lining of the lateral pipe extends part-way along the lateral pipe rather than over the entire length.

It is therefore an object of the present invention to provide a lateral pipe lining material and lateral pipe lining method whereby all operations can be performed from the main pipe side, and the lateral pipe can always be reliably lined regardless of the conditions at the ground level.

SUMMARY OF THE INVENTION

A lateral pipe lining material according to the present invention is comprised of a tubular resin absorbing material impregnated with a setting resin and has a flange formed on one end thereof, the lateral pipe lining material being everted and inserted into a lateral pipe to be repaired. The lateral pipe lining material comprises a peeling tube having one end mounted on an outer periphery of an area around the flange, and a tubular peeling end having one end closed off and the other end mounted on an outer periphery of the tubular resin absorbing material, wherein the other end of the peeling tube is mounted on a pressure bag for everting and inserting the tubular lining material.

A lateral pipe lining method according to the present invention uses a lateral pipe lining material that is comprised of a tubular resin absorbing material impregnated with a setting resin and has a flange formed on one end thereof. The lateral pipe lining method comprises the steps of preparing a peeling tube and mounting one end thereof to an outer periphery of the area around the flange; mounting a tubular peeling end having one end closed off to an outer peripheral part of the other end of the tubular resin absorbing material; mounting the other end of the peeling tube on a pressure bag; attaching the flange of the lateral pipe lining material to a peripheral edge of an opening of the lateral pipe of a main pipe; feeding compressed air into the pressure bag to evert and insert the lateral pipe lining material into the lateral pipe from the main pipe side toward ground level; heating the lateral pipe lining material while the lateral pipe lining material is pressed against an inner peripheral surface of the lateral pipe; and peeling the peeling end from the main pipe side and removing it after the setting resin impregnated in the lateral pipe lining material has been cured.

Further features of the invention, its nature and various advantages will be more apparent from the accompanying drawings and following detailed description of the invention.

DESCRIPTION OF THE PREFERRED EMBODIMENTS

Figure 1:
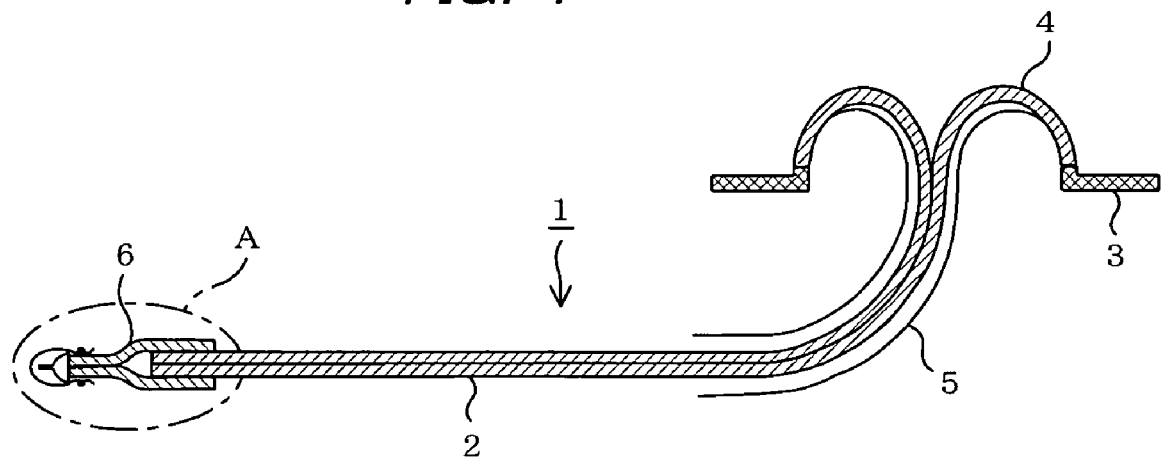
FIG. 1 is a cross-sectional view of a lateral pipe lining material according to the present invention.

The present invention will now be described in detail with reference to the embodiments shown in the drawings.

A lateral pipe lining material 1 shown in FIG. 1 is composed of a tubular resin absorbing material 2 made of a nonwoven fabric, one end of which is folded outward to form a flange 3. The portion excluding the flange 3 of the tubular resin absorbing material 2 is impregnated with an uncured liquid thermosetting resin, and the inner surface of the portion is coated with a highly airtight plastic film 4.

Polyester, polypropylene, nylon, acrylic, vinylon, or another material is selected for use as the nonwoven material constituting the tubular resin absorbing material 2. Unsaturated polyester resin, epoxy resin, or another material is used for the thermosetting resin impregnated in the tubular resin absorbing material. Polyurethane, polyethylene, polyethylene/nylon copolymer, vinyl chloride or another material is selected for the plastic film 4.

Figure 3:
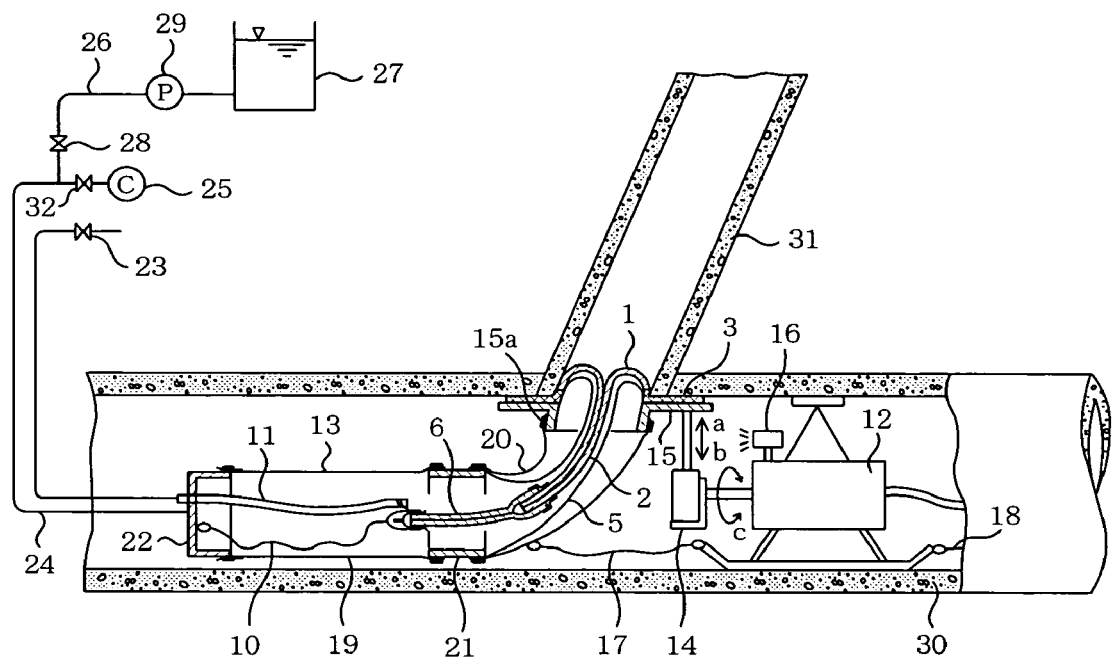
FIG. 3 is a cross-sectional view showing the lateral pipe lining method according to the present invention.

The flange 3 formed at one end of the tubular resin absorbing material 2 has a curved surface bent in an arcuate form having a curvature equivalent to that of a main pipe 30 described hereunder (see FIG. 3). The outer diameter of the flange 3 is set to be greater than the inner diameter of a lateral pipe 31 described hereunder (see FIG. 3), and the setting resin impregnated into the flange 3 is cured to cause the shape thereof to be maintained.

A peeling tube 5 of a predetermined length passes through and encircles the outer side of the tubular resin absorbing material 2, one end of the peeling tube 5 is peelably bonded to an outer periphery of an area around the flange 3 of the tubular resin absorbing material 2, and the other end is opened. The same material is selected for the peeling tube 5 as was selected for the plastic film 4.

A tubular peeling end or peeling member 6 is peelably mounted to the other end of the tubular resin absorbing material 2. The peeling end 6 is composed of the same material as the plastic film 4. One end of the peeling end 6 is closed off by a fastener 7, and the opening at the other end is fitted to the outer periphery of the tubular resin absorbing material 2. The peeling end 6 and tubular resin absorbing material 2 are connected via a thin plastic film 9 that is welded to both members, as shown in detail in FIG. 2. A pulling rope 10 and air-removal hose 11 are connected to the peeling end 6 by a nut 7 and bolt.

Figure 4:
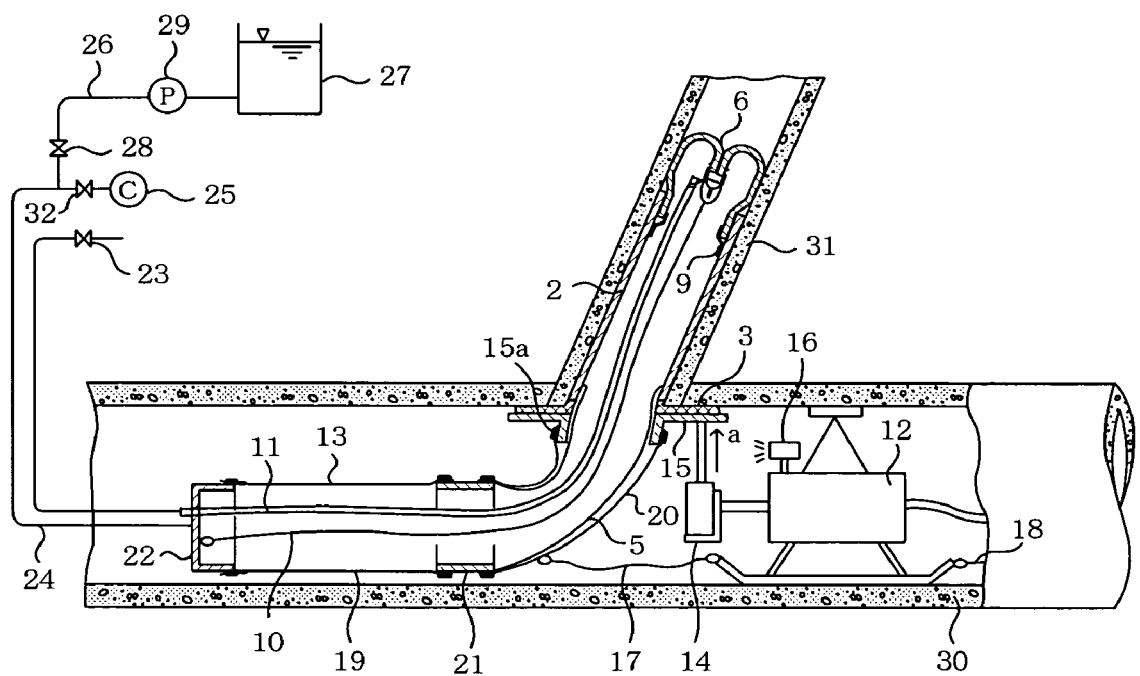
FIG. 4 is a cross-sectional view showing the lateral pipe lining method according to the present invention.
Figure 5:
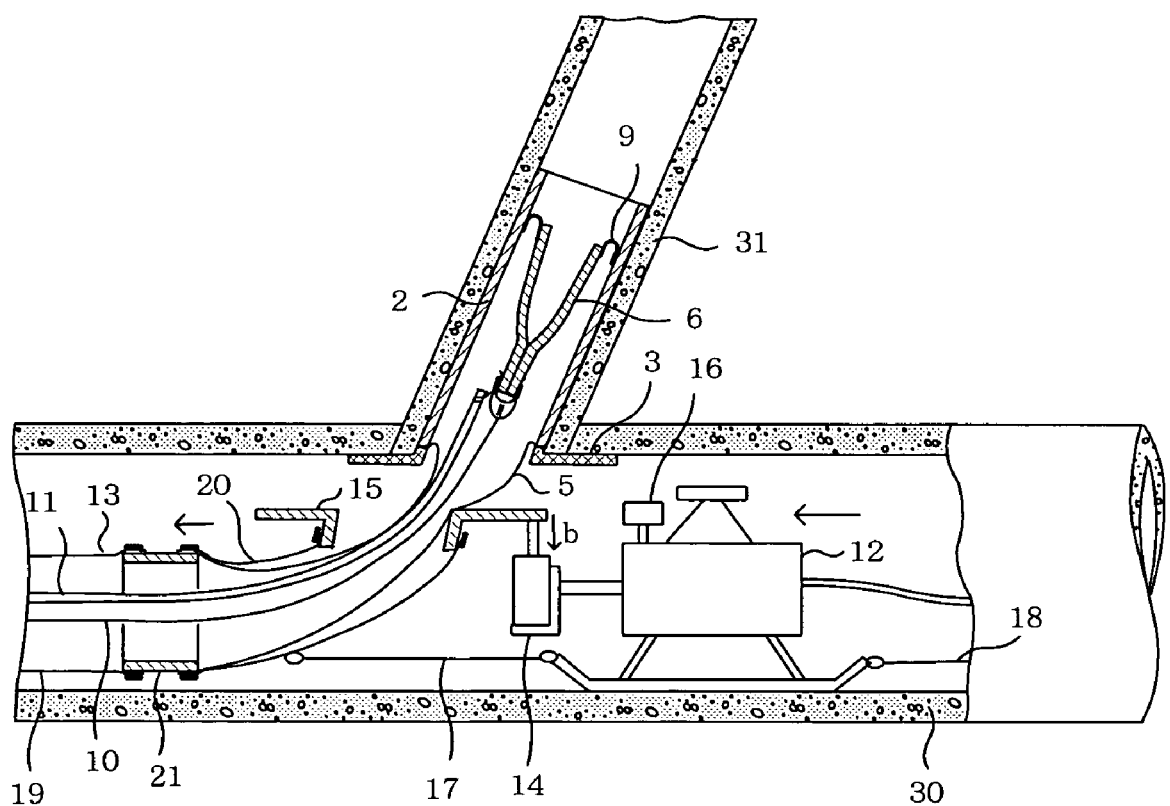
FIG. 5 is a cross-sectional view showing the lateral pipe lining method according to the present invention.

A lateral pipe lining method using the above-described lateral pipe lining material 1 shall next be described with reference to FIGS. 3 through 5.

In FIG. 3, reference numeral 30 shows a sewer pipe or other main pipe and reference numeral 31 shows a small-diameter lateral pipe that branches off from the main pipe 30. A work robot 12 that has been assembled and integrated above ground, a pressure bag 13, the lateral pipe lining material 1, and the like are drawn into the main pipe 30.

A head 14 of the work robot 12 advances in the direction of arrows a, b of FIG. 3 and rotates in the direction of an arrow c. A flange-shaped setting nozzle 15 is supported by the head 14. A monitoring TV camera 16 is provided to the upper part of the work robot 12. Pulling ropes 17 and 18 are mounted to the front and rear of the work robot 12. One of the pulling ropes 17 is connected to the pressure bag 13, and the other pulling rope 18 extends to the ground level.

The pressure bag 13 comprises two flexible tubes 19 and 20 that are connected by a cylindrical joint 21, an open end of one of the tubes 19 is closed off by a cap 22, and an open end of the other tube 20 is mounted to a tubular part 15a of the setting nozzle 15.

The flange 3 of the lateral pipe lining material 1 is set on the setting nozzle 15, and the other non-everted portion passes through the setting nozzle 15 and is housed in the pressure bag 13. The pulling rope 10 connected to the peeling end 6 is mounted to the cap 22, the air-removal hose 11 penetrates the cap 22 and extends out from the pressure bag 13, and a valve 23 is mounted to an end of the air-removal hose 11.

The peeling tube 5 mounted to the outer periphery of the tubular resin absorbing material 2 is also housed in the pressure bag 13, and the open end of the peeling tube 5 is airtightly mounted between the tube 20 and the outer periphery of the joint 21.

A sealed space that is closed off by the lateral pipe lining material 1 and peeling tube 5 is formed in the pressure bag 13. The sealed space is connected to a compressor 25 disposed at the ground level via an air/hot water hose 24 mounted to the cap 22 and is connected to a hot water tank 27 via a hot water hose 26 that branches off from the air/hot water hose 24. A valve 28 and hot water pump 29 are connected at positions midway along the hot water hose 26, and a valve 32 is connected to the air/hot water hose 24.

In the above description, the work robot 12 and the lateral pipe lining material 1, pressure bag 13, and other members supported by the work robot move as a whole within the main pipe 30 to the position shown in FIG. 3. The head 14 of the work robot 12 is moved upward in the direction of the arrow a, and the flange 3 of the lateral pipe lining material 1 is pressed against, and is attached to, a peripheral edge wall of the opening of the lateral pipe of the main pipe 30.

Next, the compressor 25 is driven and compressed air is fed to the sealed space in the pressure bag 13 via the air/hot water hose 24. This causes the lateral pipe lining material 1 to receive the pressure of the compressed air and to be successively inserted, while being everted, from the main pipe 30 into the lateral pipe 31 toward the ground level side (upward), as shown in FIG. 4. At this time, the peeling tube 5 seals the sealed space in an airtight fashion.

The length of the tubular resin absorbing material 2 of the lateral pipe lining material 1 is set to be shorter than the length of the lateral pipe 31. On the completion of the eversion and insertion of the lateral pipe lining material 1 into the lateral pipe 31 as shown in FIG. 4, the tubular resin absorbing material 2 of the lateral pipe lining material 1 is pressed against the inner peripheral wall of a portion of the lateral pipe 31, the peeling end 6 is also everted as shown in the drawing, and the air-removal hose 11 connected to the peeling end is drawn into the sealed space. The plastic film 9 connecting the peeling end 6 and tubular resin absorbing material 2 faces the interior of the sealed space.

When hot water is fed into the sealed space via the hot water hose 26 and air/hot water hose 24, the compressed air inside the sealed space is discharged to the atmosphere via the air-removal hose 11. The linear pipe lining material 1 is heated while being pressed against the internal peripheral wall of the lateral pipe 31 as shown in FIG. 4, the thermosetting resin contained within the tubular resin absorbing material 2 is cured, and a portion of the inner peripheral surface of the lateral pipe 31 is lined and repaired (midway lining) by the cured tubular resin absorbing material 2.

When the tubular resin absorbing material 2 of the lateral pipe lining material 1 is cured, the hot water is removed from the sealed space. The head 14 of the work robot 12 is then moved downward in the direction of the arrow b shown in the drawing, the setting nozzle 15 is detached from the flange 3 of the lateral pipe lining material 1, and the air-removal hose 11 and the like are pulled in the direction of the arrow (the leftward direction of FIG. 5), as shown in FIG. 5. Once this action is complete, the peeling tube 5 and peeling end 6 are pulled in the same direction, the peeling tube 5 is peeled from the lateral pipe lining material 1, and the peeling end 6 is pulled away from the tubular resin absorbing material 2. Then, the air-removal hose 11, work robot 12, pressure bag 13, peeling tube 5, and peeling end 6 are moved as a whole through the main pipe 30 and removed from the main pipe 30, and the operation sequence for lining the lateral pipe 31 is complete.

In the embodiment, once the lateral pipe lining material 1 has been cured, the peeling end 6 is peeled off and removed. Therefore, an operation need not be performed for cutting off the everted end of the lateral pipe lining material 1 at ground level, and all operations can be performed at the main pipe side. As a result, the lateral pipe 31 can always be reliably lined regardless of the conditions at the ground level.

Figure 6:
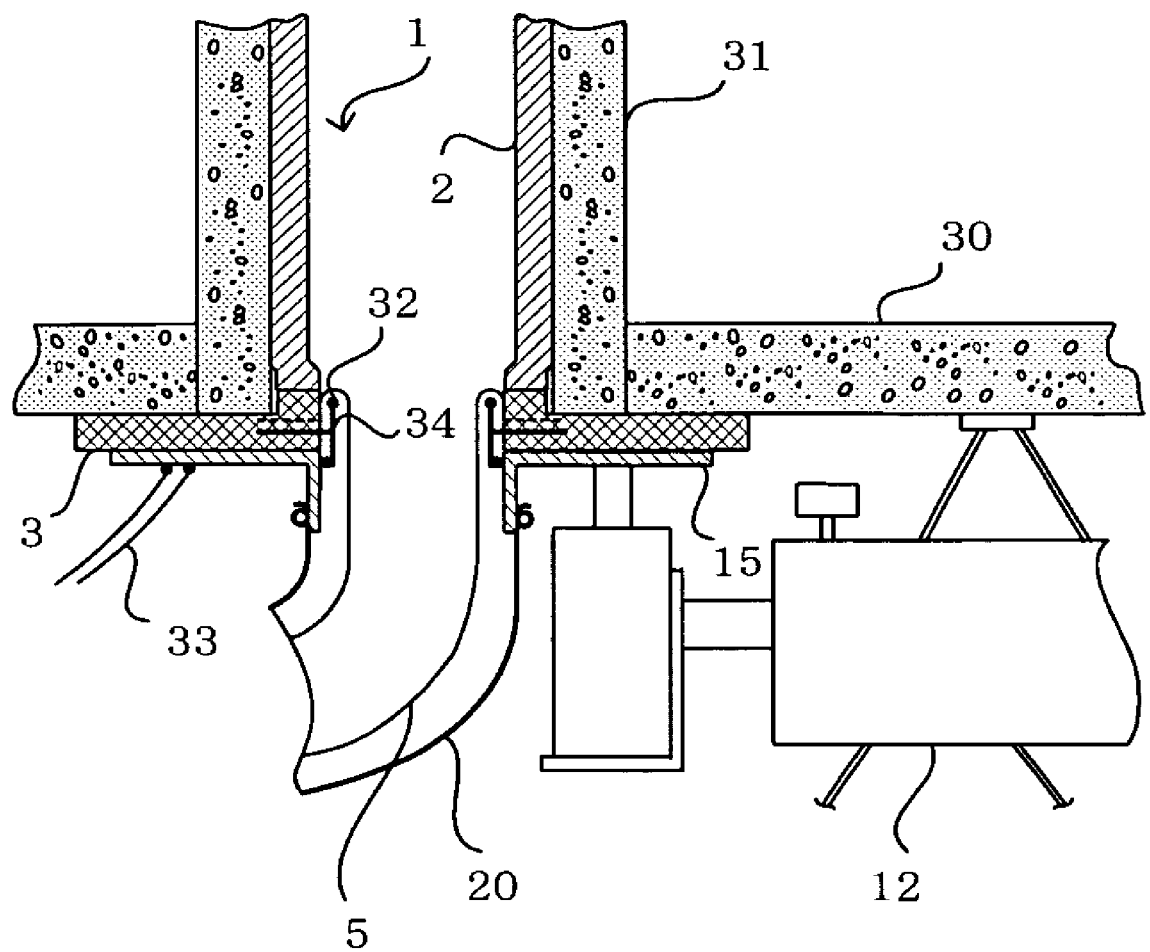
FIG. 6 is a cross-sectional view of an intersection between a main pipe and a lateral pipe when the flange of the lateral pipe lining material is closed off using a peeling tube.

In the above embodiment, one end of the peeling tube 5 is merely peelably bonded to the outer periphery of the area around the flange 3 of the tubular resin absorbing material 2. Therefore, a risk arises that the peeling tube will peel partway along, the compressed air will leak out, and the lateral pipe lining material will be impossible to evert and insert. For this reason, the lateral pipe-side end of the peeling tube 5 is integrally mounted so as to be embedded in the flange 3 of the lateral pipe lining material 1, as shown in FIG. 6. In such a configuration, the peeling tube 5 will not peel or break even if subjected to high pressure. Therefore, the lateral pipe lining material 1 can be reliably everted and inserted into the lateral pipe 31.

In FIG. 6, reference numeral 34 indicates a metallic perforated protecting member, with a heat generator (heater) 32 being mounted to an upper end surface of the perforated protecting member. Therefore, once the lining of the lateral pipe is complete, electricity is provided to the heater 32 via an electric cable 33, and the heater 32 is made to generate heat to melt the peeling tube 5. This enables the peeling tube 5 to be cut from the flange 3.

Figure 7:
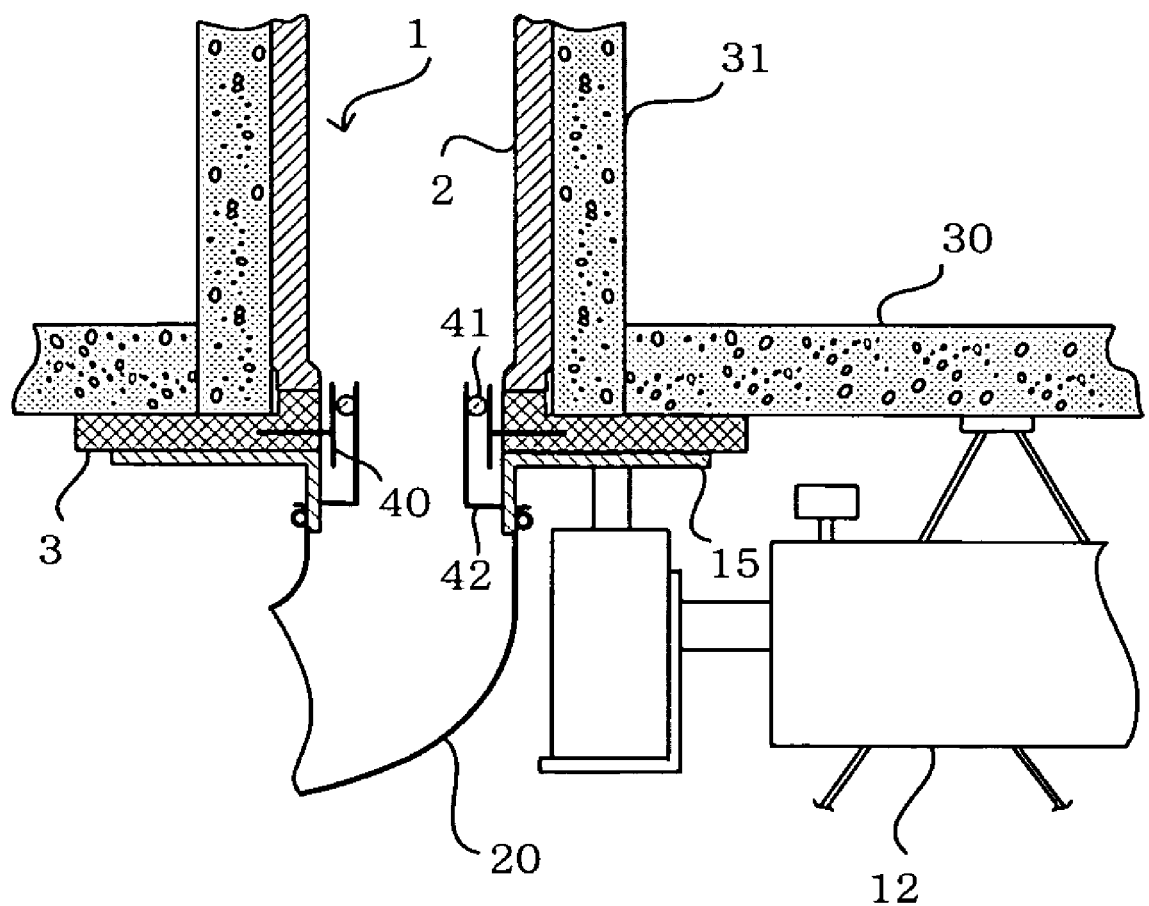
FIG. 7 is a cross-sectional view of an intersection between a main pipe and a lateral pipe when the flange lateral pipe lining material is closed off using an elastic member.

In the embodiment shown in FIG. 7, a cylindrical sealing member 40 is integrally formed on the flange 3 via an injection method using a metallic or rigid plastic material, and a cylindrical distal end nozzle 42 is fixed to the setting nozzle 15. A ring-shaped elastic body 41 is fitted between the sealing member 40 and the distal end nozzle 42. The elastic body 41 is pressed against an inner peripheral surface of the sealing member 40 and seals the distal end nozzle 42 and sealing member 40 in an airtight fashion. Accordingly, the inner peripheral surface of the sealing member 40 is subjected to pressure from the elastic body 41, a sealing wall surface for sealing off fluid pressure is formed, and a high level of airtightness is ensured. Therefore, the compressed air does not leak and the lateral pipe lining material 1 can reliably be everted and inserted into the lateral pipe 31.

In such a configuration, an airtight connection between the pressure bag and the lateral pipe lining material is formed by the elastic member interposed between the distal end nozzle and the sealing member. Once the process of lining the lateral pipe is complete, the pressure bag is removed from the lateral pipe lining material by removing the distal end nozzle from the fluid-sealing member. Therefore the peeling tube 5 shown in FIGS. 1 and 6 is unnecessary.

In the above-described embodiments, the flange of the lateral pipe lining material can also be formed from a plastic molding and attaching the plastic molding to one end of the lateral pipe lining material.

Figure 2:
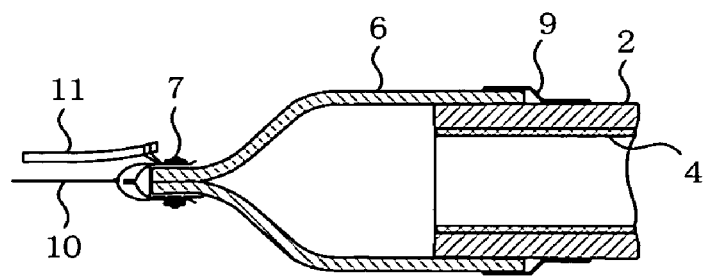
FIG. 2 is an expanded view showing the portion A of FIG. 1 in detail.

In addition, in FIG. 2, the peeling end 6 is connected to the tubular resin absorbing material 2 by the plastic film 9. However, alternatively, the peeling end can be attached to the tubular resin absorbing material 2 via welding using heat or plasma, or via bonding using a bonding material or the like.

To cure the thermosetting resin, hot water may be sprinkled as a shower against the thermosetting resin. Instead, hot water or steam may also be sprayed as a mist against the thermosetting resin to cure it.

In the embodiments above described, a thermosetting resin is used as a setting resin, but a UV curing resin may be used as a setting resin. In this case, the UV curing resin is irradiated with ultraviolet light for resin curing.

What is claimed is:

1. A lateral pipe lining material for eversion and insertion into a lateral pipe to be repaired, the lateral pipe lining material comprising:

a tubular resin absorbing material impregnated with a setting resin and having a flange formed on one end thereof;

a peeling tube having one end mounted on an outer periphery of an area around the flange and the other end attachable to a pressure bag for everting and inserting the lateral pipe lining material into a lateral pipe to be repaired; and a tubular peeling end having one end closed off and the other end mounted on an outer periphery of the tubular resin absorbing material.

2. A lateral pipe lining material according to claim 1, wherein the tubular peeling end is directly welded or bonded to an outer peripheral part at the other end of the tubular resin absorbing material.

3. A lateral pipe lining material according to claim 1, wherein the tubular peeling end is directly welded or bonded to an outer peripheral part at the other end of the tubular resin absorbing material.

4. A lateral pipe lining material according to claim 1, wherein the one end of the peeling tube is mounted by bonding to an outer periphery of the area around the flange.

5. A lateral pipe lining material according to claim 1, wherein the one end of the peeling tube is mounted to an outer periphery of the area around the flange so as to be embedded in the flange.

6. A lateral pipe lining material according to claim 1, wherein the setting resin is a thermosetting resin or UV curing resin.

7. A lateral pipe lining method using a lateral pipe lining material that is comprised of a tubular resin absorbing material impregnated with a setting resin and has a flange formed on one end thereof, comprising the steps of:

preparing a peeling tube and mounting one end thereof to an outer periphery of the area around the flange;

mounting a tubular peeling end having one end closed off to an outer peripheral part of the other end of the tubular resin absorbing material;

mounting the other end of the peeling tube on a pressure bag;

attaching the flange of the lateral pipe lining material to a peripheral edge of an opening of the lateral pipe of a main pipe;

feeding compressed air into the pressure bag to evert and insert the lateral pipe lining material into the lateral pipe from the main pipe side toward ground level;

heating the lateral pipe lining material while the lateral pipe lining material is pressed against an inner peripheral surface of the lateral pipe; and peeling the peeling end from the main pipe side and removing it after the setting resin impregnated in the lateral pipe lining material has been cured.

8. A lateral pipe lining method according to claim 7, wherein the peeling tube provides a sealed space between the pressure bag and the lateral pipe lining material.

9. A lateral pipe lining method according to claim 7, wherein a sealed space is formed between the pressure bag and the lateral pipe lining material via an elastic body.

10. A lateral pipe lining method according to claim 7, wherein the setting resin is a thermosetting resin or UV curing resin.

11. A lateral pipe lining material comprising: a tubular resin absorbing material having an outwardly extending flange at one end; a peeling tube encircling one end portion of the tubular resin absorbing material, one end of the peeling tube being peelably attached to an outer periphery of the tubular resin absorbing material at or near the flange and the other end being configured for attachment to a pressure bag;

and a tubular peeling member one end of which is closed and the other end of which is peelably attached to the outer periphery of the other end of the tubular resin absorbing material.

12. A lateral pipe lining material according to claim 11; wherein the one end of the peeling tube is embedded in the flange.

13. A lateral pipe lining material according to claim 11; wherein the one end of the peeling tube is bonded to the outer periphery of the tubular resin absorbing material at or near the flange.

14. A lateral pipe lining material according to claim 11; further including a plastic film connecting the other end of the tubular peeling member and the other end of the tubular resin absorbing material.

15. A lateral pipe lining material according to claim 14; wherein the plastic film and the tubular peeling member are composed of the same material.

16. A lateral pipe lining material according to claim 11; wherein the one end of the tubular peeling member is closed by a fastener.

17. A lateral pipe lining material according to claim 11; wherein the flange is comprised of cured resin impregnated material.

18. A lateral pipe lining material according to claim 17; wherein the tubular resin absorbing material is comprised of nonwoven fabric.

* * * * *